United States Patent
Ohta et al.

(10) Patent No.: US 7,525,807 B2
(45) Date of Patent: Apr. 28, 2009

(54) SEMICONDUCTOR MEMORY DEVICE

(75) Inventors: Haruo Ohta, Kyotanabe (JP); Takeshi Ohtsuka, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 423 days.

(21) Appl. No.: 10/554,103

(22) PCT Filed: Dec. 11, 2003

(86) PCT No.: PCT/JP03/15833

§ 371 (c)(1),
(2), (4) Date: Oct. 21, 2005

(87) PCT Pub. No.: WO2004/095363

PCT Pub. Date: Nov. 4, 2004

(65) Prior Publication Data

US 2006/0221711 A1    Oct. 5, 2006

(30) Foreign Application Priority Data

Apr. 23, 2003    (JP) .............................. 2003-118242

(51) Int. Cl.
    *H05K 1/14* (2006.01)
(52) U.S. Cl. ...................................... 361/737; 361/715
(58) Field of Classification Search ................. 361/727, 361/737, 730, 741, 726, 715; 257/777–779
    See application file for complete search history.

(56) References Cited

U.S. PATENT DOCUMENTS

| | | | |
|---|---|---|---|
| 5,563,400 A | 10/1996 | Le Roux | |
| 5,712,811 A | 1/1998 | Kim | |
| 6,097,605 A | 8/2000 | Klatt et al. | |
| 6,266,724 B1 | 7/2001 | Harari et al. | |
| 6,353,780 B1 | 3/2002 | Hart | |
| 6,915,956 B2 * | 7/2005 | Liu et al. | 235/492 |
| 7,110,262 B2 * | 9/2006 | Matsumoto et al. | 361/737 |

(Continued)

FOREIGN PATENT DOCUMENTS

EP    0 775 964    5/1997

(Continued)

OTHER PUBLICATIONS

PC Card Standard, Release 7.0, Feb. 1999, PCMCIA, JEIDA, vol. 3, Physical Specification, pp. 5, 3. Card Dimensions, 3.1 Write Protect Switch (WPS), Figure 11-3.

*Primary Examiner*—Hung S Bui
(74) *Attorney, Agent, or Firm*—Wenderoth, Lind & Ponack, L.L.P.

(57) ABSTRACT

A semiconductor memory device according to the present invention comprises a housing including a card bus connector for connection to a host device and having a PC card shape having a thickness of 5.0 mm, four SD memory cards housed in the housing and a control circuit for controlling transmission/reception of a signal between the card bus connector and the respective SD memory cards. The semiconductor memory device is suitably used as a recording medium of a host device for which a higher data transfer rate and a larger memory capacity are demanded. Further, a semiconductor memory device, which is attachable and detachable relative to the host device and thereby portable, and relatively inexpensively obtainable, can be provided, and is directly insertable into a laptop personal computer to be used.

12 Claims, 7 Drawing Sheets

U.S. PATENT DOCUMENTS

| | | |
|---|---|---|
| 7,170,754 B2 * | 1/2007 | Asom et al. .................. 361/737 |
| 7,264,992 B2 * | 9/2007 | Hsueh et al. ................. 438/106 |
| 2002/0078297 A1 | 6/2002 | Toyama et al. |
| 2002/0101722 A1 * | 8/2002 | Oguchi et al. ............... 361/728 |
| 2003/0109179 A1 | 6/2003 | Kaneshiro et al. |

FOREIGN PATENT DOCUMENTS

| | | |
|---|---|---|
| JP | 6-195524 | 7/1994 |
| JP | 8-315100 | 11/1996 |
| JP | 2001-188883 | 7/2001 |
| JP | 2001-306182 | 11/2001 |
| JP | 2001-357943 | 12/2001 |
| JP | 2002-189992 | 7/2002 |
| JP | 2003-108963 | 4/2003 |
| JP | 2004-38353 | 2/2004 |
| WO | 00/68770 | 11/2000 |

* cited by examiner

SEMICONDUCTOR MEMORY DEVICE

TECHNICAL FIELD

The present invention relates to a semiconductor memory device attachable and detachable relative to a host device such as a video camera recorder or a laptop personal computer.

BACKGROUND ART

In recent years, various types of memory cards, which are attachable and detachable relative to a host device and thereby handily portable, are widespread along with an increasingly developed larger capacity of a non-volatile semiconductor memory such as a flash memory.

An example of the memory cards is a memory card having a PC card size standardized as the PC Card Standards by the PCMCIA (Personal Computer Memory Card International Association).

In the PC Card Standards, a physical shape and a size of the card, examples of which are nominal dimensions of basic data such as a shape, a width, a length and a largest thickness of the card and tolerances of the dimensions, as well as a signal interface relative to the host device, are regulated. To exemplify the physical size of the card, a card whose nominal dimension of a width is 54.0 mm, nominal dimension of a length is 85.6 mm, and nominal dimension of a thickness in a thickest part is 5.0 mm is Type II. A card having the same nominal dimensions as in the Type II in width and length, whose nominal dimension of a thickness in a thickest part is 10.5 mm is Type III, and other similar sizes, are regulated.

Further, a memory card increasingly made available particularly for consumer use is a so-called compact-size memory card having a size smaller than that of the PC card and used as a recording medium in a commercial device such a digital camera and a mobile audio player.

As examples of the compact-size memory card, a generally called compact flash (Registered trade mark) card, smart media (Registered trade mark), memory stick (Registered trade mark), SD memory card (Registered trade mark) and the like are publicly known. "Interface", issued in December 1999, p. 52-p. 55 (CQ Publishing CO., Ltd.) discloses examples of those cards. A specification of the SD memory card (Registered trade mark), such as a shape, a size, and the like thereof, is determined by the SD Association.

BRIEF DISCLOSURE OF THE INVENTION

When a memory card is used as a recording medium in, for example, a video camera recorder for recording a moving image of a high quality for long hours, or the like, a data transfer rate required for recording and reproduction is significantly increased, which leads to a significant increase of a volume of data to be recorded. Therefore, a data transfer rate and a memory capacity of the compact-size memory card such as the SD memory card does not always satisfy a required level, which raises demand for a memory device achieving a higher rate and a larger capacity.

Further, a conventional laptop personal computer may be provided with a slot for a PC card; however, it is not generally provided with a slot for a compact-size memory card to be directly inserted into. Accordingly, it becomes necessary to confirm recorded contents of the compact-size memory card in a personal computer in the case of editing the recorded data in the personal computer, and it also becomes necessary to additionally provide an adapter insertable into the PC-card slot, or an adapter capable of USB connection, which are quite inconvenient.

Though some memory cards having a PC card size are available, the memory cards of the foregoing type are mainly targeted for some specific industries in recent years. As a current status resulting therefrom, those memory cards have failed to achieve as fast a progress in increasing the rate and the memory capacity as the compact-size memory cards widely available for commercial use, and are sold at comparatively higher prices.

The present invention was implemented in order to overcome the foregoing disadvantages, and a main object thereof is to provide a semiconductor memory device suitably used as a recording medium in a host device demanding a higher data transfer rate and a larger memory capacity such as a video camera recorder for recording a moving image of a high quality for long hours, attachable and detachable relative to the host device and thereby portable, and relatively low-budget.

Another object of the present invention is to provide a semiconductor memory device attaining a higher data transfer rate and a larger memory capacity, realizable at a relatively low price, and directly insertable and usable relative to a host device not provided with a slot for a compact-size semiconductor memory card to be directly inserted into such as a conventional laptop personal computer.

Therefore, a semiconductor memory device according to the present invention comprises a housing having a connecting section for connection to a host device, a plurality of compact-size semiconductor memory cards housed in the housing, and a control means for controlling transmission/reception of a signal between the connecting section and the plurality of compact-size semiconductor memory cards.

According to the foregoing constitution, the plurality of compact-size semiconductor memory cards obtainable at a relatively low price is used so that a high data transfer rate and a large memory capacity can be inexpensively realized, and the plurality of compact-size semiconductor memory cards is housed together with the control means in the housing having the connecting section for the connection to the host device to be thereby attachable and detachable relative to the host device and portable.

Further, in a semiconductor memory device according to the present invention, the housing may have a size in compliance with type II of the PC Card Standards and comprise four compact-size semiconductor memory cards in compliance with the SD Memory Card Standards.

According to the foregoing constitution, the compact-size semiconductor memory device, in which the data transfer rate is higher and the memory capacity is increased, can be relatively inexpensively realized, and can be directly insertable and usable relative to a host device not provided with a slot for inserting the compact-size semiconductor memory card such as a conventional laptop personal computer.

The present invention can provide a semiconductor memory device having a thin card shape, suitable for use as the recording medium in a host device demanding a higher data transfer rate and larger memory capacity such as a video camera recorder for recording a high-quality moving image for a long time, attachable and detachable relative to the host device, and thereby portable, and inexpensively purchasable.

The semiconductor memory device can be directly inserted into a host device, such as a conventional laptop personal computer, not provided with a slot for inserting a compact-size semiconductor memory card such as an SD memory card without using an exclusive adapter or the like. Accordingly, data handling, such as confirmation of recorded contents of the compact-size semiconductor memory card and editing of data recorded therein, in the host device, such as a personal computer, can be effectively facilitated.

BEST MODE FOR CARRYING OUT THE INVENTION

Hereinafter, a preferred embodiment of the present invention is described in detail with reference to the drawings.

Figure 1A:
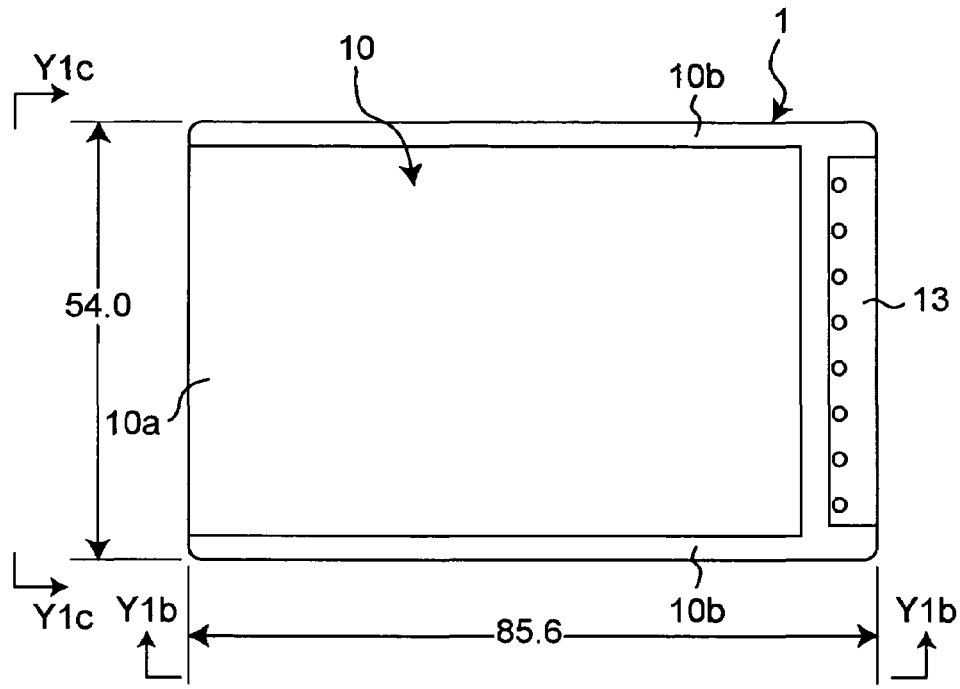
FIGS. 1 (a) to 1 (c) are illustrations of an outer shape and a size of a semiconductor memory device according to an embodiment of the present invention, wherein FIG. 1 (a) is a plan view, FIG. 1 (b) is a side view in the direction of Y1b-Y1b arrows in FIG. 1 (a), and FIG. 1 (c) is a side view in the direction of Y1c-Y1c arrows in FIG. 1 (a).
Figure 1B:
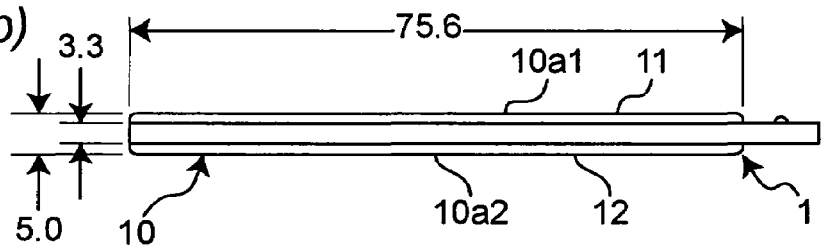
Figure 1C:
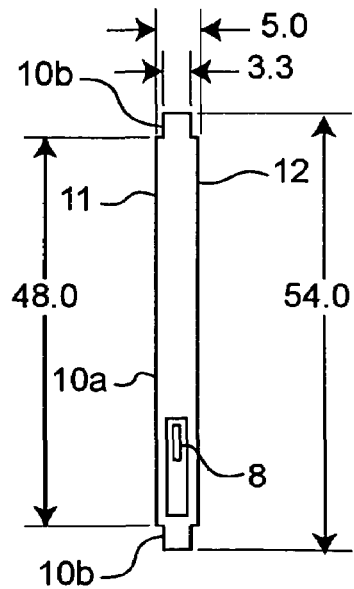
Figure 2:
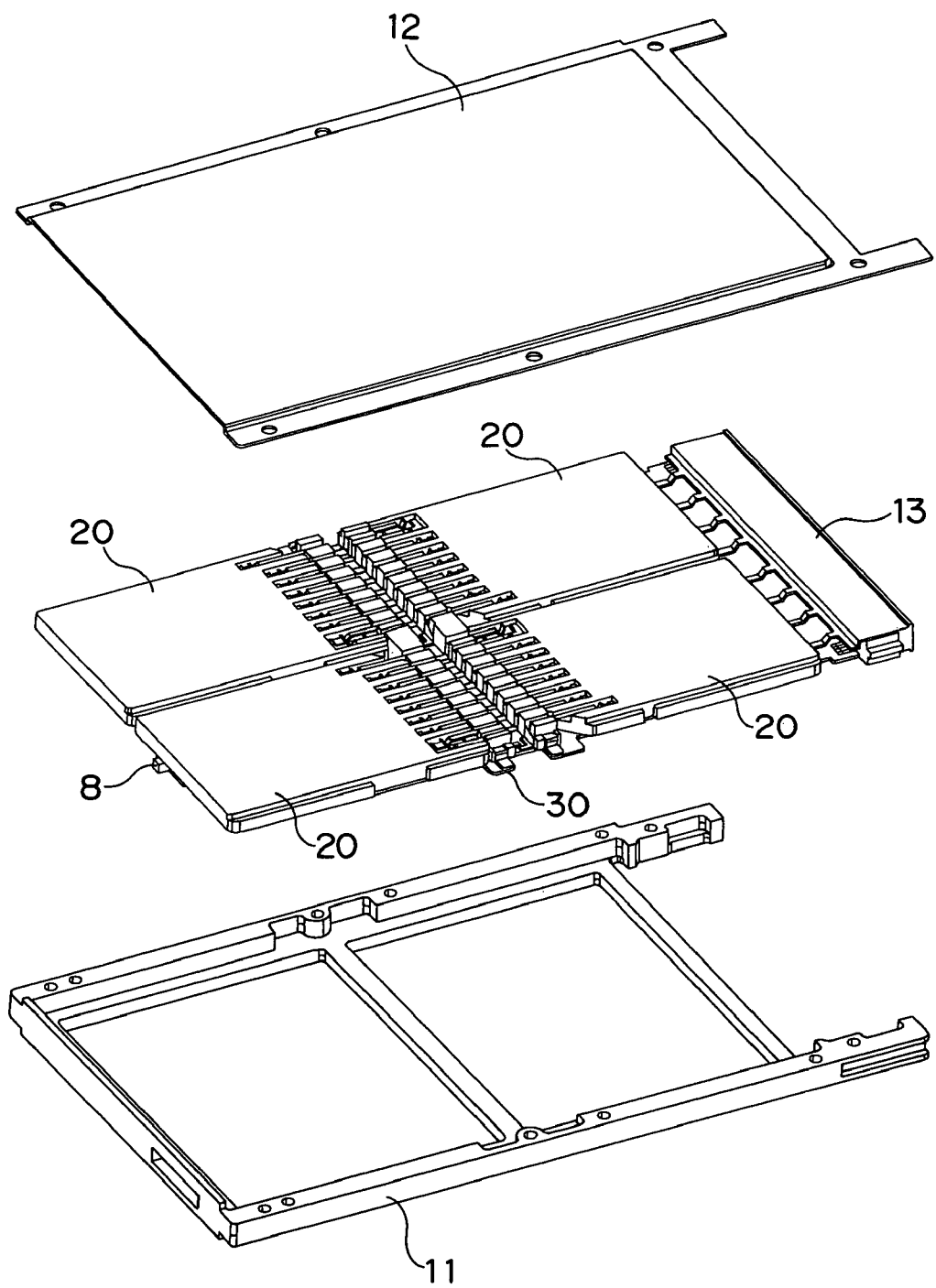
FIG. 2 is an exploded perspective view of the semiconductor memory device.

FIG. 1 are illustrations of an outer shape and a size of a semiconductor memory device having a thin card shape according to the present embodiment, wherein FIG. 1 (a) is a plan view, FIG. 1 (b) is a side view in the direction of Y1b-Y1b arrows in FIG. 1 (a), and FIG. 1 (c) is a side view in the direction of Y1c-Y1c arrows in FIG. 1 (a). FIG. 2 is an exploded perspective view of a schematic structure of the semiconductor memory device.

As shown in these drawings, a semiconductor memory device 1 according to the present embodiment comprises, as basic components, a housing (case) 10 formed by combining a lower-side member 11 and an upper-side member 12 and a plurality of compact-size semiconductor memory cards 20 housed in the housing 10. The compact-size semiconductor memory card 20 is a resin-packaged semiconductor memory device and formed in a flat card shape having a predetermined shape and size. In the present embodiment, as described later, a memory card conforming to the SD Memory Card Standards by the SD Association is used as the compact-size semiconductor memory card 20.

A card bus connector 13 as a connecting section for connection to a host device (not shown) is retained on an end side of the lower-side member 11 in a longitudinal direction thereof. The card bus connector 13 is similar to any conventional and publicly known item and used for the connection to a host device (not shown) such as a video camera recorder or a personal computer using a semiconductor memory device 1. A write prohibition switch 8 is provided on an end surface of the housing 10 opposite to the card bus connector 13.

The housing 10 is formed in a substantially rectangular shape in plan view, and both end sections 10b of the housing 10 have a predetermined width in a shorter-edge direction thereof which is thinner than an intermediate section 10a thereof in the same direction. The four compact-size semiconductor memory cards 20 are flatly housed in the housing 10. More specifically, two of the compact-size semiconductor memory cards 20 are adjacently disposed in the shorter-edge direction of the housing 10, and two of the compact-size semiconductor memory cards 20 are also adjacently disposed in the longitudinal direction thereof.

The intermediate section 10a comprises a first expanding part 10a1 and a second expanding part 10a2 expanding from the both end sections 10b in one direction and another direction (upward and downward in FIG. 1 (b)) in a thickness direction of the housing 10. The four compact-size semiconductor memory cards 20 are housed on the first expanding part 10a1 side, while a control means of the semiconductor memory device 1 (described later) is disposed on the second expanding part 10a2 side.

Next, an internal structure of the semiconductor memory device 1 is described.

Figure 3A:
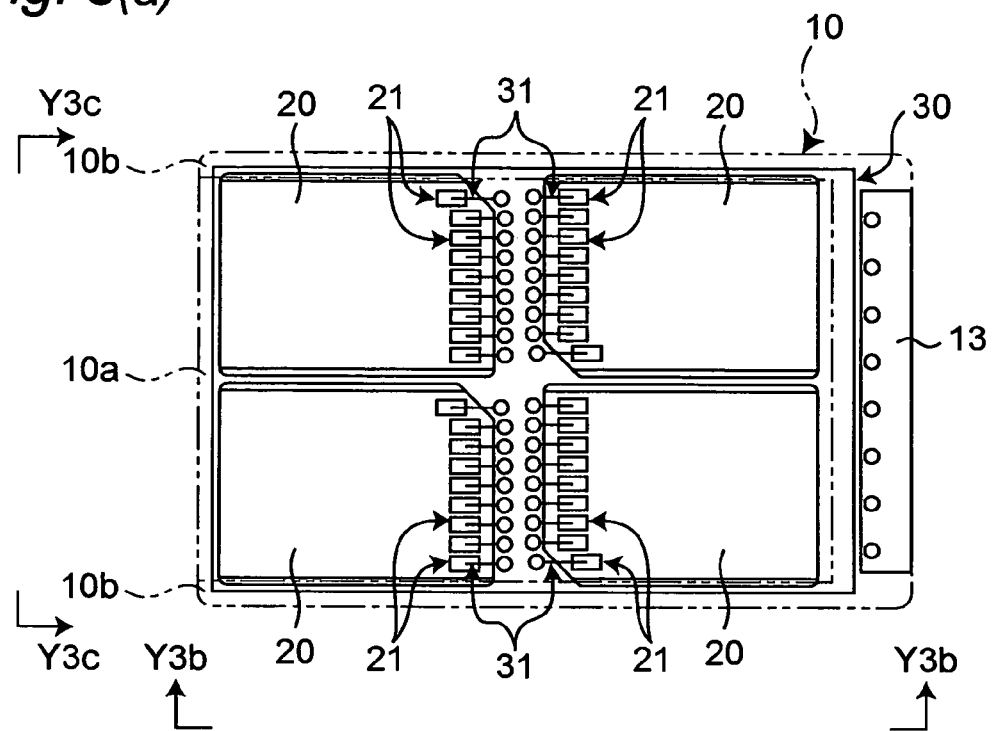
FIGS. 3 (a) to 3 (c) are illustrations of an internal structure of the semiconductor memory device, wherein FIG. 3 (a) is a plan view, FIG. 3 (b) is a side view in the direction of Y3b-Y3b arrows in FIG. 3 (a), and FIG. 3 (c) is a side view in the direction of Y3c-Y3c arrows in FIG. 3 (a).
Figure 3B:
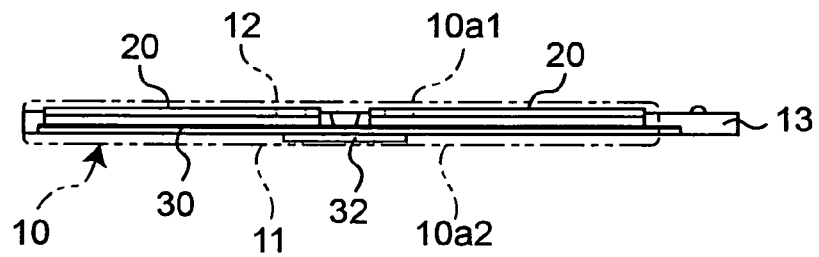
Figure 3C:
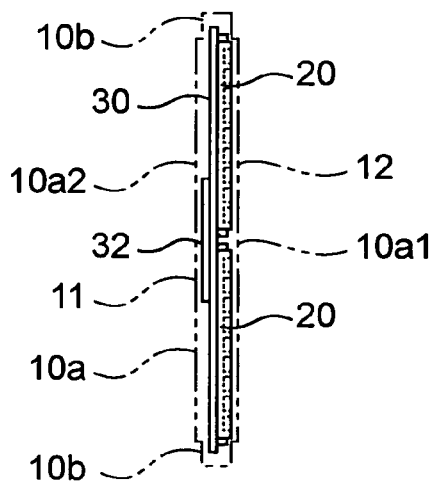
Figure 4:
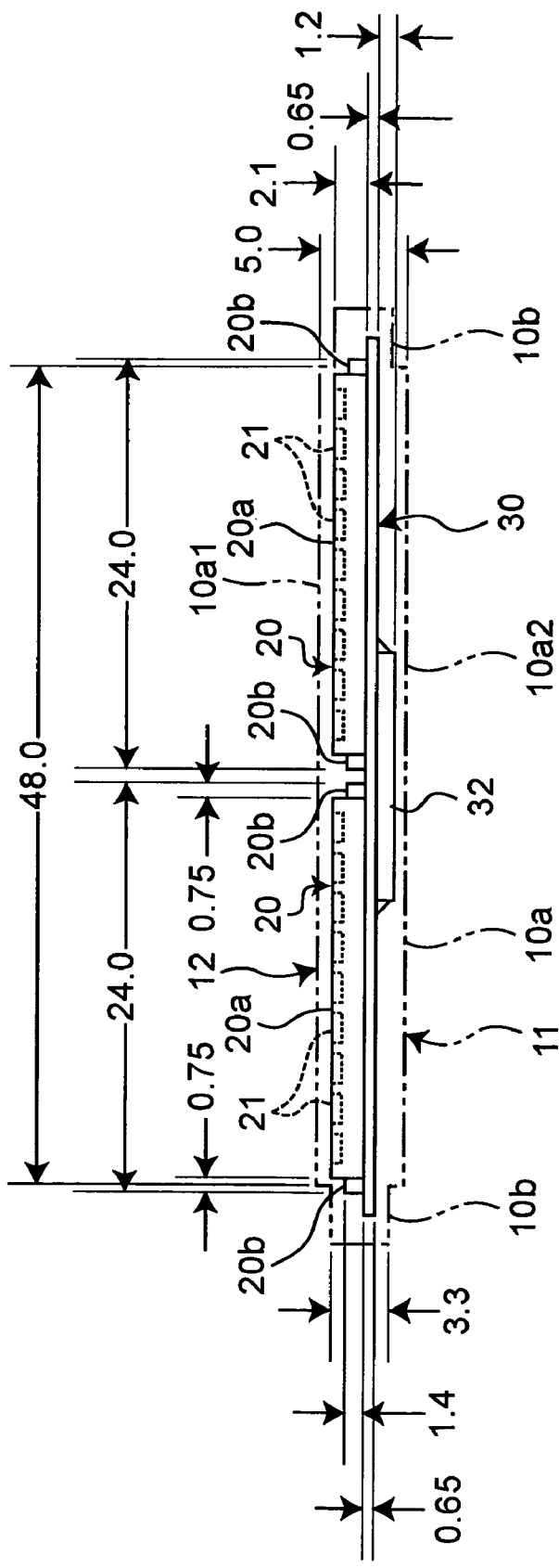
FIG. 4 is an enlarged illustration of FIG. 3 (c).
Figure 5A:
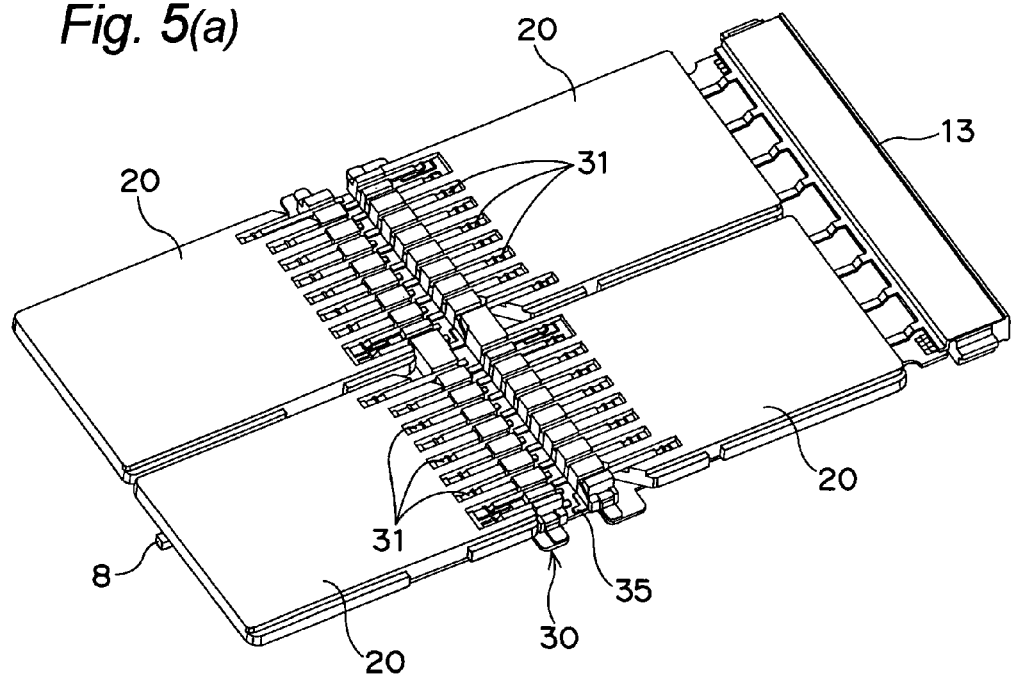
FIGS. 5 (a) and 5 (b) are illustrations of the internal structure of the semiconductor memory device, wherein FIG. 5 (a) is a perspective view showing a state in which compact-size semiconductor memory cards 20 are completely set, and FIG. 5 (b) is a perspective view showing a state of a currently ongoing sliding movement of one of the compact-size semiconductor memory cards 20.
Figure 5B:
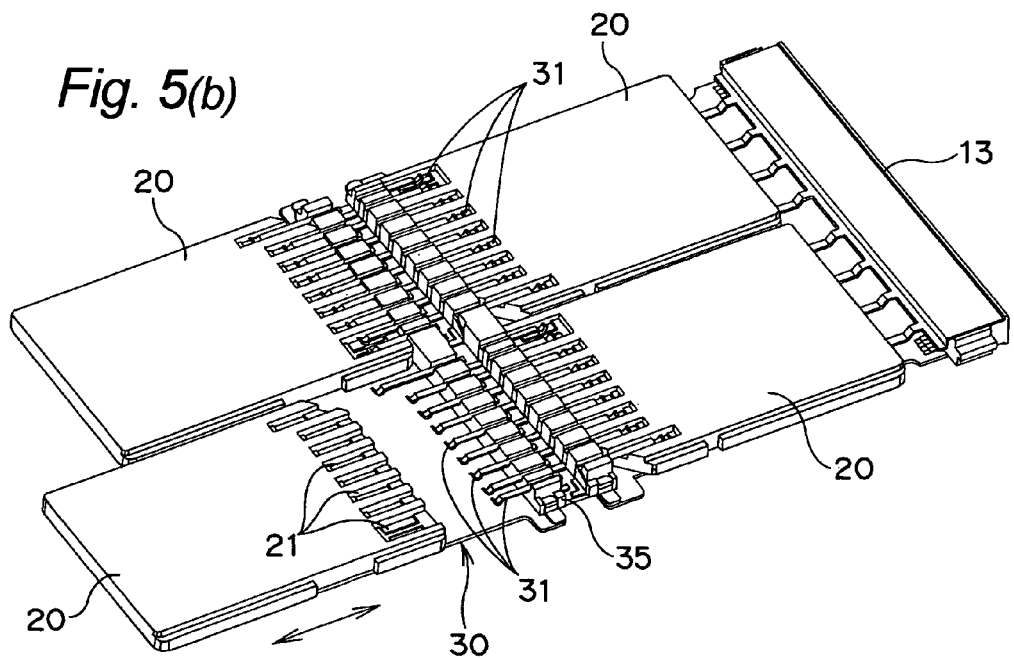

FIGS. 3 (a) to 3 (c) are illustrations of an internal structure of the semiconductor memory device 1, wherein FIG. 3 (a) is a plan view, Fig. (b) is a side view in the direction of Y3b-Y3b arrows in FIG. 3 (a), and FIG. 3 (c) is a side view in the direction of Y3c-Y3c arrows in FIG. 3 (a). FIG. 4 is an enlarged illustration of FIG. 3 (c). FIGS. 5 (a) and (b) are perspective views of the internal structure of the semiconductor memory device 1, wherein FIG. 5 (a) shows a state in which the compact-size semiconductor memory cards 20 are completely set, and FIG. 5 (b) shows a state of a currently ongoing sliding movement of a part of the compact-size semiconductor memory cards 20. In any of FIGS. 3 (a), 3 (b) and 3 (c) and FIG. 4, the housing 10 is shown in a virtual line (chain double-dashed line).

As shown in these drawings, a circuit substrate 30, whose additional role is a retaining plate for retaining the compact-size semiconductor memory cards 20, is provided in the housing 10. More specifically, one surface of the circuit substrate 30 (upper surface in FIG. 3 (b)) constitutes a retaining part for retaining the compact-size semiconductor memory cards 20. The four compact-size semiconductor memory cards 20 are disposed flat on the one surface of the circuit substrate 30, and thereby retained.

On another surface side of the circuit substrate 30 (lower surface in FIG. 3 (b)) is provided a control circuit 32 serving as a control means for controlling transmission/reception of a signal between the card bus connector 13 and the plurality (four) of compact-size semiconductor memory cards 20.

Further, both edge sections of the circuit substrate 30 in a shorter-edge direction thereof are retained in both end sections 10b of the housing 10 in the shorter-edge direction thereof.

Next, a size of the semiconductor memory device 1 is specifically described.

Referring to a size of the housing 10 in the present embodiment, as shown in FIGS. 1 (a), 1 (b) and 1 (c), a width nominal dimension is set to 54.0 mm, a length nominal dimension is set to 85.6 mm, and a thickness nominal dimension of a thickest part is set to 5.0 mm.

As described, both end sections 10b of the housing 10 have a predetermined width in the shorter-edge direction thereof which is thinner than the intermediate section 10a in the same direction. The intermediate section 10a comprises the first expanding part 10a1 and the second expanding part 10a2 respectively expanding in one direction and in the opposite direction, in the thickness direction of the housing 10, and the intermediate section 10a constitutes the thickest part. More specifically, a nominal thickness dimension of the intermediate section 10a, having a length of 48.0 mm, in a central part of the housing 10 is 5.0 mm, and a nominal thickness dimension of both end sections 10b, each having a length of 3.0 mm (=(54.0−48.0)/2) provided on the right and left ends, is 3.3 mm.

An outer shape and a size of the housing 10 shown in FIG. 1 are in compliance with a size standardized as Type II of the PC Card Standards by the PCMCIA (Personal Computer Memory Card International Association).

As an example of the card standardized by the PCMCIA, other than the Type II, the Type I of the PC Card Standards, whose nominal dimension of an entire thickness is set to 3.3 mm (constant), and the like, can be mentioned. The thickness of both end sections 10b of the housing 10 in the width direction is made thinner than the intermediate section 10a because a guide rail width of an insertion slot on the host device side can be accommodated by conforming the thickness of both end sections 10b (nominal dimension of 3.3 mm) to Type I of the PC Card Standards, and the like, so that Type I and Type III can be inserted into the same slot.

The outer shape and size of Type II of the PC Card Standards is recited in, for example, "PC Card Standard 8.0, Volume 3 Physical Specification," p. 39, issued in 2001 by the PCMCIA. An external appearance of the card bus connector 13 is also recited in p. 64 of the same literature.

The numerical values of the nominal dimensions denote standard dimensions of the respective sizes, and for each of which a small range of tolerance is allowed based on the standards defined by the PCMCIA.

Figure 6:
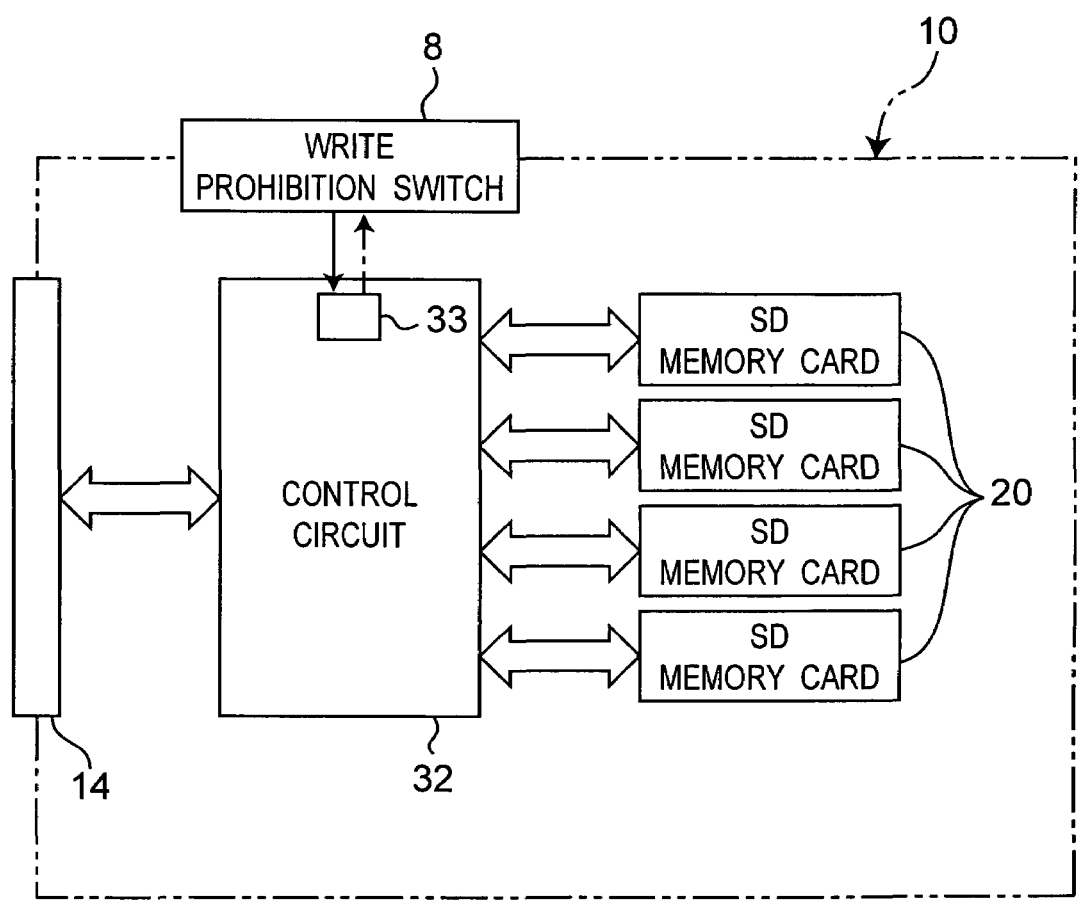
FIG. 6 is a schematic block diagram illustrating a control of the semiconductor memory device.

FIG. 6 is a block diagram illustrating a flow of an electric signal of the semiconductor memory device 1 according to the present embodiment. These circuit blocks are housed inside the housing 10.

In FIG. 6, the semiconductor memory device 1 and the host device using the semiconductor memory device 1 (such as a video camera recorder or a personal computer, which are not shown) are physically connected via the card bus connector 13, and electric-signal-wise connected via a card bus interface 14 in FIG. 6.

The card bus interface 14 is connected to the control circuit 32, and a command such as write/read and data are transmitted between the interface 14 and the host device. The signal transmitted via the card bus interface 14 is subjected to an electrical regulation recited in "PC Card Standard 8.0, Volume 2 Electrical Specification," p. 65-p. 186, issued in 2001 by the PCMCIA. The card bus interface 14 enables the write/read data transfer at such a high rate as 133 M bytes/sec at maximum (hereinafter, described as MB/sec).

In the present embodiment, a memory card in compliance with the SD Memory Card Standards by the SD Association is used as the compact-size semiconductor memory card 20. The four SD memory cards 20 and the write prohibition switch 8 are also connected to the control circuit 32. A memory card having the capacity of 512 M bytes and the data transfer rate of 10 MB/sec, for example, is employed as the SD memory card 20.

Next, a write operation is described.

In the write operation from a host device (not shown) such as a video camera recorder or a personal computer to the semiconductor memory device 1, a write command and write data are transferred via the card bus interface 14. The control circuit 32 issues the write command to each of the four SD memory cards (Registered trade mark) 20, and divides the write data into four systems and parallelizes them. Then, the control circuit 32 simultaneously transfers the write data thus divided into the four systems and parallelized to the respective SD memory cards 20.

As a result of the foregoing operation, the write data transferred via the card bus interface 14 is parallelized in the four systems and written in the four SD memory cards (R: Registered trade mark) 20 respectively having the data transfer rate of 10 MB/sec. Therefore, on the whole, the write data is recorded in the respective SD memory cards 20 at the rate of 40 MB/sec in the divided manner. Further, because the write data is recorded in the four SD memory cards 20 in the divided manner, a memory capacity of the entire semiconductor memory device 1 corresponds to a total of memory capacities of the four SD memory cards 20. In the present example, the total is obtained by multiplying 512 M bytes by four, resulting in 2 G bytes. The card bus interface 14 is capable of a data transfer rate of 133 MB/sec at maximum, as described earlier, and therefore does not impose any limit to the transfer rate of 40 MB/sec.

As shown in FIG. 1 (c), the write prohibition switch 8 is provided at the end of the semiconductor memory device 1 on the opposite side of the card bus connector 13. The switch 8 sets a prohibition to write to the SD memory cards 20 and releases the setting by its opening/closing operation.

The control circuit 32 refers to the write prohibition switch 8 to check if it is opened or closed when receiving a write command from the host device via the card bus interface 14, and does not execute the write operation with respect to the SD memory cards 20 when a write is prohibited.

More specifically, the control circuit 32 is provided with a monitor circuit 33 (not shown) for monitoring if the operation state (opened or closed) of the write prohibition switch 8, and controls the write operation with respect to the SD memory cards 20 so that it is prohibited when the monitor circuit 33 detects that the write prohibition switch 8 is set on the write prohibition side.

In place of controlling the write prohibition by the control circuit 32 of the semiconductor memory device 1, a detection signal of the monitor circuit 33 may be transmitted to the host device (for example, a personal computer) so that the write operation with respect to the SD memory cards 20 can be prohibited by a control means of the host device. Further, the monitor circuit 33 may be independently provided outside the control circuit 32.

When the write prohibition switch 8 is operated as described, a possible malfunction, that is to carelessly erase the data already stored in the semiconductor memory device 1 (in other words, in the respective SD memory cards 20), can be effectively prevented.

The write prohibition switch 8 is disposed at the end of the housing 10 on the opposite side of the card bus connector 13 in such a manner as to be operable from outside of the housing 10. Therefore, the confirmation of the opening/closing state and operation of the write prohibition switch 8 can be performed even in a state in which the semiconductor memory device 1, including the housing 10, is inserted into the host device.

Next, a read operation is described.

In a read operation from the semiconductor device 1 to the host device such as a video camera recorder or a personal computer, a read command is transferred from the host device side via the card bus interface 14. In the control circuit 32, the data is divided and parallelized and then recorded with respect to the four SD memory cards 20 in the write operation, and is read therefrom at the same time. Then, the respective divided data are unified in a procedure reverse to the write operation. The unified data is transferred to the host device via the card bus interface 14.

As a result of the foregoing operation, the data parallelized into the four systems can be read at the same time and unified with respect to the four SD memory cards 20 respectively having the data transfer rate of 10 MB/sec. Therefore, on the whole, the data can be read at the rate of 40 MB/sec.

Below is described an assembling step of the semiconductor memory device 1 having the thin card shape according to the present embodiment, that is, how the four SD memory cards 20, circuit substrate 30 and control circuit 32 are mounted inside the housing 10 having a limited size.

Figure 7:
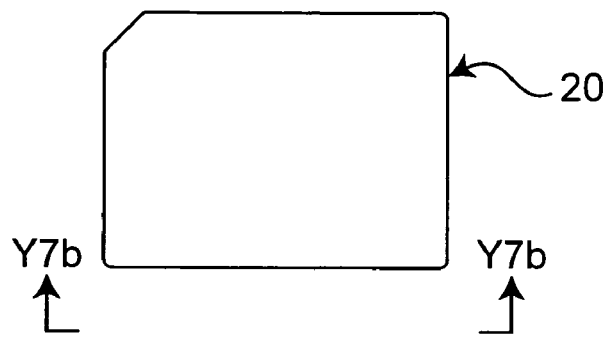
FIGS. 7 (a) to 7 (d) are illustrations of an outer shape and a size of the compact-size semiconductor memory card of the semiconductor memory device, wherein FIG. 7 (a) is a plan view, FIG. 7 (b) is a side view in the direction of Y7b-Y7b arrows in FIG. 7 (a), FIG. 7 (c) is a bottom view, and FIG. 7 (d) is a side view in the direction of Y7d-Y7d arrows in FIG. 7 (c).
Figure 7:
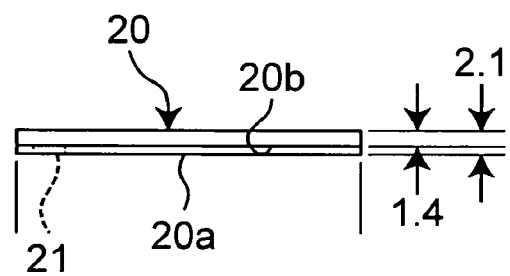
Figure 7:
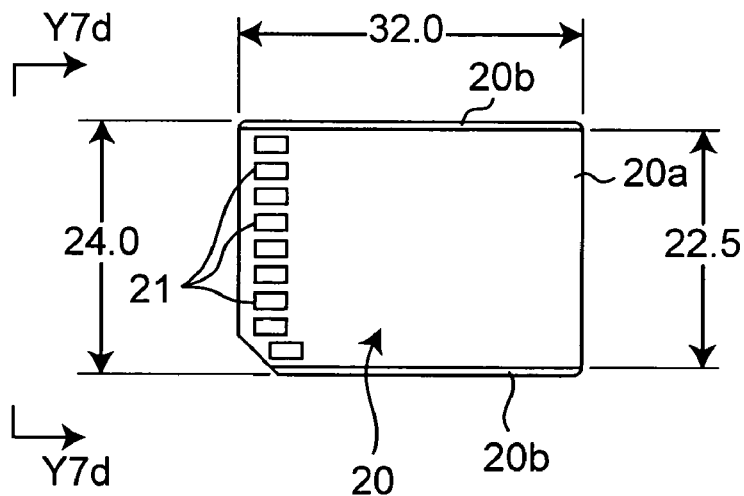
Figure 7:
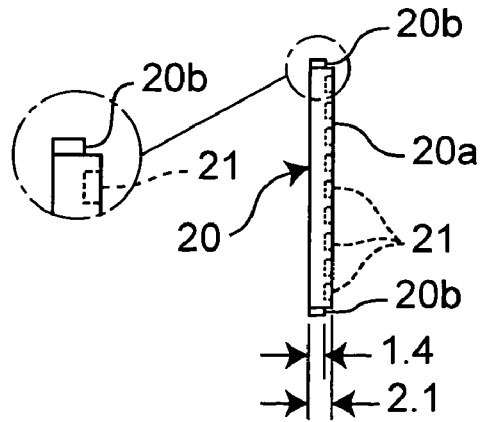

Prior to the description of the assembling step, an outer shape and a size of the SD memory card 20 are described. FIGS. 7 (a) to (c) are illustrations of the outer shape and the size of the SD memory card 20 according to the present embodiment, wherein FIG. 7 (a) is a plan view, FIG. 7 (b) is a side view in the direction of Y7b-Y7b arrows in FIG. 7 (a), FIG. 7 (c) is a bottom view, and FIG. 7 (d) is a side view in the direction of Y7d-Y7d arrows in FIG. 7 (c).

In the description below, a plane surface of the SD memory card on which connecting terminals are not provided is referred to as an upper surface, while a plane surface thereof on which nine connecting terminals 21 are provided is referred to as a lower surface. Referring to a side surface, one side thereof on which the connecting terminals 21 are provided is referred to as a front surface.

As shown in FIGS. 7 (a) through 7 (d), in each of the SD memory cards 20, a width nominal dimension is set to 24.0 mm, a length nominal dimension is set to 32.0 mm, and a nominal dimension of a largest thickness is set to 2.1 mm. More specifically, referring to a thickness direction of the card, a thickness nominal dimension of a central section 20a in a width direction thereof (part having the width of 22.5 mm) is 2.1 mm, however, a nominal dimension of a thickness of the right and left end sections 20b having the width of 0.75 mm (=(24.0−22.5)/2) is set to 1.4 mm, which is thinner. As clearly seen from the partially enlarged view of FIG. 7 (d), the end sections 20b show a stepwise shape in which only the lower surface side provided with the connecting terminals 21 is recessed (gouged).

The foregoing shape of the SD memory card 20 is standardized by the SD Association, a simple overview of which is introduced in, for example, "TECHI Intensive Study of PC Card/Memory Card," p. 216-p. 230, issued in October, 2002 by CQ Publishing CO., Ltd.).

The numerical values of the respective nominal dimensions each denote a standard dimension of the size, for which a small range of tolerance is allowed based on the standards defined by the SD Association.

In the semiconductor memory device 1 according to the present embodiment, the respective components constituting the circuit blocks shown in FIG. 6, which are the circuit substrate 30 and the control circuit 32 in addition to the four SD memory cards 20 whose outer shape and size are shown in FIGS. 7 (a) through 7 (d), are mounted in the housing 10 whose outer shape and size are shown in FIGS. 1 (a) through 1 (c). How the respective components are mounted is shown in FIGS. 3 (a) through 3 (c) and FIG. 4 described earlier. In any of these drawings, the housing 10 is shown as a virtual line (chain double-dashed line).

As described before with reference to the drawings, the circuit substrate 30 retaining the four SD memory cards 20 on the one surface thereof (upper surface in FIG. 3 (b)) is provided in the housing 10, and the control circuit 32 is provided on the another surface side of the circuit substrate 30 (lower surface in FIG. 3 (b)). Both edge sections of the circuit substrate 30 in the shorter-edge direction thereof are retained within the end sections 10b of the housing 10 in the shorter-edge direction thereof. The control circuit 32 is mounted in the form of, for example, a large scale integrated circuit (LSI).

A signal line from the card bus connector 13 is connected to the circuit substrate 30 (connecting part is not shown). The respective SD memory cards 20 disposed flat on the upper surface of the circuit substrate 30 are mounted on the circuit substrate 30 in such manner that the surfaces thereof respectively provided with the nine connecting terminals 21 (lower surface) are directed upward, and the respective connecting terminals 21 are electrically connected to the circuit substrate 30 via connecting pins 31. The write prohibition switch 8 is also actually connected to the circuit substrate 30, which is, however, not shown in order to simplify the drawing.

As shown in FIGS. 7 (a) through 7 (d), the width nominal dimension of the SD memory card 20 is 24.0 mm. Therefore, when the two SD memory cards 20 are disposed in the width direction, the width dimensions of the two cards are summed to be 48.0 mm.

However, it is necessary to provide a certain degree of interval (approximately 0.5 mm) between the two SD memory cards 20 with regard to a possible expansion, mechanical torsion and the like caused by a temperature rise. As described earlier, the small range of tolerance is allowed for the width dimension of the SD memory card 20. Provided that the tolerance is +0.1 mm, a dimension variability within the scope of the tolerance needs to be considered. More specifically, the total width dimension required for disposing the two SD memory cards 20 on the circuit substrate 30 in the width direction is necessarily at least 48.7 mm (24.1 mm+0.5 mm+24.1 mm).

However, as shown in FIGS. 1 (a) through (c), the width dimension of the intermediate section 10a of the housing 10 (part having the width of 5.0 mm) is 48.0 mm. Therefore, it is not possible to accommodate all four of the SD memory cards 20 disposed on the circuit substrate 30 in the intermediate section 10a of the housing 10 because the actual dimension in the width direction is not long enough to do so. As a result, a part of the SD memory cards 20 unavoidably falls on the right and left end sections 10b (part having the thickness of 3.3 mm).

Referring to the thickness direction, as shown in FIGS. 7 (a) through 7 (d), the thickness nominal direction of the SD memory card 20 is 2.1 mm except for a part of both ends thereof in the width direction. However, provided that a tolerance for the thickness is ±0.15 mm, the thickness is 2.25 mm at maximum after considering a dimension variability within the scope of the tolerance. Because the thickness of the circuit substrate 30 is approximately 0.65 mm, a required thickness resulting from the foregoing numeral values is 2.9 mm.

In contrast to that, the thickness of each of the end sections 10b of the housing 10 is 3.3 mm, and the thickness of each of the upper and lower members of the housing 10 in the relevant part is approximately 0.25 mm. Therefore, an inner space at the end section 10b in the thickness direction is allowed to have not more than 2.8 mm (=3.3 mm−(0.25×2) mm), which results in a failure to secure a space thick enough to accommodate the circuit substrate 30 and the SD memory cards 20 disposed thereon in the right and left end sections 10b of the housing 10 (part having the thickness of 3.3 mm).

Hypothetically using a substrate thinner by 0.1 mm (having the thickness of 0.55 mm) as the circuit substrate 30, the thickness of the used circuit substrate and the thickness of the SD memory card 20 are summed to be 2.8 mm, which makes it possible for the substrate and the SD memory cards 20 to be housed in the end sections 10b of the housing 10 (part having the thickness of 3.3 mm). However, even in the foregoing case, on the lower side of the circuit substrate 30, a space securable in the intermediate section 10a of the housing 10 has a dimension of less than 1 mm in the thickness direction, and it is not possible to dispose the control circuit 32 in the foregoing space on the lower side of the circuit substrate 30.

In order to deal with the foregoing circumstances, according to the present embodiment, the SD memory cards 20 are mounted on the circuit substrate 30 in such manner that the surfaces thereof provided with the connecting terminals 21 are directed upward. FIG. 4 specifically shows the mounting state.

As shown in FIGS. 7 (a) through 7 (d), in the SD memory card 20, the central section 20a thereof has a thickness of 2.1 mm, while the end sections 20b thereof in the width direction respectively have the thickness of 1.4 mm. The end sections are made thinner than the central section 20a because the surface side thereof provided with the connecting terminals 21 is gouged (recessed) (see FIG. 7 (d)). The widths of the thinner end sections 20b are respectively 0.75 mm from the right and left edges.

As specifically shown in FIG. 4, the SD memory card 20 is mounted on the circuit substrate 30 in such manner that the surface thereof provided with the connecting terminals 21 is directed upward so that a part of the thinner sections 20b on the right and left ends of the SD memory card 20 stays beyond the intermediate section 10a of the housing 10 (the part having the thickness of 5.0 mm) and fits in the right and left end sections 10b of the housing 10 (the part having the thickness of 3.3 mm).

In the foregoing arrangement, the two SD memory cards having a width dimension of 24.0 mm, which are disposed in the width direction with an interval of approximately 0.5 mm secured therebetween, can be safely housed in the housing 10 even after considering the presence of a tolerance (for example, ±0.1 mm) in the width dimension of the SD memory card 20.

Further, referring to the thickness direction, the control circuit 32 having a thickness of 1.2 mm can be safely mounted in the presence of a sufficient space on the lower side of the circuit substrate 30. Thereby, all of the circuit blocks shown in FIG. 6 can be housed in the housing 10 whose outer shape and size are set based on the Type II of the PC Card Standards. More specifically, the circuit substrate 30 and the control circuit 32, in addition to the four SD memory cards 20, can be housed in the housing 10. The control circuit 32 is formed from an electronic part such as LSI and mounted on the circuit substrate 30 by means of a solder.

Further, in the present embodiment, of the four SD memory cards 20 provided in the housing 10, the memory cards adjacently disposed in a length direction of the housing 10 are mounted in a direction where the connecting terminals 21 thereof are in close vicinity, as obviously known from FIGS. 5 (a) and 5 (b).

When the four SD memory cards 20 are disposed according to the foregoing constitution, the connecting terminals 21 of the four SD memory cards 20 are disposed in close vicinity to the central section of the housing 10 in the length direction thereof so that the nine connecting pins 31 required for each of the SD memory cards 20 can be disposed in a central section of the circuit substrate 30 in a length direction thereof in a concentrated manner. Thereby, the connecting pins 31 can be efficiently provided.

Further, as clearly learnt from FIGS. 5 (a) and 5 (b), a mounting base 35 for mounting a multiplicity of connecting pins 31 is provided in a substantially central section of the circuit substrate 30 in the length direction thereof so that all of the connecting pins 31 necessary for the four SD memory cards 20 can be integrally fit to the mounting base 35. Thereby, the connecting pins 31 can be more efficiently provided, which contributes to a manufacturing cost reduction. Further, the mounting operation of the SD memory cards 20 can be facilitated. Further, because there is only a short distance between the mounting base 35 and the control circuit 32 disposed in the center on the lower surface of the circuit substrate 30, wiring to be provided can be lessened, and a signal transmitted therebetween can be thereby prevented from deteriorating.

In the case of providing the mounting base 35, as shown in FIG. 5 (b), the respective SD memory cards 20 are slid along the upper surface of the circuit substrate 30 until they abut the mounting base 35 so that the connecting terminals 21 are overlapped with the connecting pins 31 so as to assure a contact therebetween. Thereby, an electrical connection can be surely obtained. In this case, the SD memory cards 20 are preferably arrested between the connecting pins 31 and the upper surface of the circuit substrate 30 by a vertical energizing force of the connecting pins 31. Alternatively, the respective SD memory cards 20 may be fixedly boded to the upper surface of the circuit substrate 30.

Further, in the present embodiment, referring to the housing 10, the foregoing respective components are housed in the space formed by the lower-side member 11 and the upper-side member 12 as described, and a thermosetting adhesive, for example, is applied to peripheral parts and/or a vicinity of the lower-side member 11 and upper-side member 12 so that the lower-side member 11 and upper-side member 12 are tightly bonded and fixed to each other.

Therefore, when the semiconductor memory device 1 is once assembled, it is not easy to open and dismantle the housing 10, meaning that a user cannot easily remove the internally mounted SD memory cards 20 out of the housing 10. In other words, in the foregoing case, the adhesive plays a role as a "restricting mechanism" for restricting the removal of the SD memory cards 20 out of the housing 10.

As described, the recorded data from the host device is divided into the four systems and recorded in the four SD memory cards 20. Therefore, it is necessary to have all of the four SD memory cards 20 and to fix their position in order to reproduce the recorded data. Because it is not easy to remove the SD memory cards 20 mounted in the housing 10 therefrom in the present embodiment, the four SD memory cards 20 cannot be separately stored and can be fixed in position, which assures the reproduction of the recorded data.

The "restricting mechanism" for restricting the removal of the SD memory cards 20 out of the housing 10 can employ various types of conventional technologies other than the foregoing adhesive. For example, the lower-side member 11 and the upper-side member 12 of the housing 10 may be fixed to each other by means of thermal adhesion, spot welding or riveting. Further, the SD memory cards 20 themselves may be fixedly bonded to the circuit substrate. Moreover, the lower-side member 11 and the upper-side member 12 may be fixed to each other by means of screws having a special shape, which cannot be removed by an ordinary driver.

To describe an alternative method employing a publicly known conventional technology, a protruding piece for engagement is provided in one of the members, while an opening having a slit shape for the protruding piece to be inserted through is provided in the other of the members, and the both members are combined with each other so that the protruding piece is inserted through the slit-shape opening. Thereafter, an edge side of the protruding piece is folded back by means of an exclusive machine tool so that the lower-side member 11 and the upper-side member 12 are mechanically joined together. Also in this case, because an exclusive machine tool is required for separating the members to thereby dismantle the housing, the user cannot easily remove the SD memory cards out of the housing.

As thus far described, in the semiconductor memory device 1 having the thin card shape according to the present embodiment, the four SD memory cards 20 and the control circuit 32 for controlling the SD memory cards 20 are incorporated in the housing 10 whose outer shape and size are set based on the PC Card Standards. When a signal from the host device is parallelly stored in the four SD memory cards 20 and read therefrom, the data transfer rate and the memory capacity are thereby quadrupled in comparison to the case when using one SD memory card 20. Therefore, the thin semiconductor memory device 1 suitable as a recording medium used in a host device for which a higher data transfer rate and a larger memory capacity are demanded, such as a video camera recorder for recording a high-quality moving image for a long time, can be provided.

Further, the semiconductor memory device 1 conforms to the PC Card Standards, and therefore, is attachable and detachable relative to a host device provided with a slot for mounting a PC card, such as a conventional laptop personal computer, and can be handily carried as the recording medium thereof. In particular, the semiconductor memory device 1 can be directly inserted into a host device such as a conventional laptop personal computer without using any exclusive adapter. Therefore, data handling, such as confirmation of the recorded contents and editing of the recorded data in the host device, can be facilitated. Further, because the card bus interface attaining such a high data transfer rate as 133 MB/sec at maximum is adopted as the interface relative to the host device, the transfer rate is not restricted by the interface part.

Further, the semiconductor memory device 1, which employs the SD memory cards 20 used for commercial use in great quantities as an incorporated compact-type semiconductor memory, can be relatively inexpensively realized. In addition, the provision of the write prohibition switch 8 can effectively prevent such a malfunction as carelessly erasing the data already stored in the SD memory cards 20.

The present invention is not limited to the described embodiment, and the present invention can be variously modified and altered within the true spirit and scope thereof.

For example, in the present embodiment, the four SD memory cards 20 are disposed flat on the upper surface of the circuit substrate 30 in such manner that the connecting terminals 21 are directed upward, and the control circuit 32 is disposed on the lower surface of the circuit substrate 30. However, the overall upper and lower relationship in the foregoing arrangement may be reversed. More specifically, the present invention can be realized in such manner that the four SD memory cards 20 are disposed flat on the lower surface of the circuit substrate in such manner that the connecting terminals are directed downward, and the control circuit is disposed on the upper surface of the circuit substrate.

In the present embodiment, the four SD memory cards 20 are used as a plurality of compact-size semiconductor memory cards. However, a compact-size semiconductor memory card of some other type, such as a multi-media card, may be used, and the number of the used compact-size semiconductor memory cards is not limited to four.

In the case of the semiconductor memory device 1 according to the present embodiment, the outer shape and the size of the housing 10 conforms to the Type II of the PC Card Standards, however, the present invention is not limited thereto. The portability can be assured in the same manner as far as the housing 10 has the card shape having the thickness of approximately 5.0 mm or below even though the width and the length thereof are different. For example, the housing 10 may have a card shape whose nominal width dimension is 34.0 mm, nominal length dimension is 75.0 mm, and nominal thickness dimension of a thickest part is 5.0 mm, or a card shape whose nominal width dimension is 54.0 mm, nominal length dimension is 75.0 mm, and nominal thickness dimension of a thickest part is 5.0 mm.

In the present embodiment, the card bus interface is employed as the interface relative to the host device. However, the present invention is not limited thereto, and an interface other than this interface may be used. For example, an interface conforming to the PCI Express Standards for transmitting a signal in a serial mode may be adopted so as to further increase the data transfer rate.

As thus far described, according to the present embodiment, the semiconductor memory device having a thin card shape suitable for use as the recording medium of a host device for which a higher data transfer rate and a larger memory capacity are demanded, such as a video camera recorder for recording a high-quality moving image for a long time, attachable and detachable relative to the host device, and thereby portable, and relatively inexpensively obtainable can be provided.

Further, as additional effects of the present invention, the semiconductor memory device can be advantageously directly inserted into a host device such as a conventional laptop personal computer without using any exclusive adapter and used, and data handling, such as the confirmation of the recorded contents and the editing of the recorded data in the host device such as the personal computer, can be facilitated.

INDUSTRIAL APPLICABILITY

As described, the semiconductor memory device according to the present embodiment, which can realize a higher data transfer rate and a larger memory capacity, is attachable and detachable relative to the host device and thereby portable, and is obtainable at a relatively low price, is suitable as a recording medium of, for example, a video camera recorder for recording a high-quality image for a long time, or the like. Further, the semiconductor memory device, which is directly insertable into a PC-card slot without using any exclusive adapter, can be also suitably used as a recording medium of a conventional laptop personal computer, or the like.

The invention claimed is:
1. A semiconductor memory device comprising:
a plurality of semiconductor memory cards arranged in a rectangular shape, each semiconductor memory card having first edge portions disposed along the lengths of two parallel edges of said semiconductor memory card, the first edge portions being thinner than a central portion of said semiconductor memory card;
a housing for said plurality of semiconductor memory cards, said housing having:
a substantially rectangular shape so as to have a smaller axis and a larger axis, and second edge portions disposed along the lengths of two parallel edges of said housing, said second edge portions being thinner than a central portion of said housing, two of said plurality of semiconductor memory cards being disposed flat and adjacent to each other along the smaller axis of said housing, and so that one of said first edge portions of each of said two semiconductor memory cards lies in a respective one of said second edge portions of said housing;

a connecting section in said housing for connecting to a host device; and a controller in said housing for controlling transmission and reception of a signal between said connecting section and said plurality of semiconductor memory cards.

2. A semiconductor memory device as recited in claim 1, further comprising:

a switch provided in said housing and operable from outside of said housing, said switch having a state which indicates whether write operations to the plurality of semiconductor memory cards are allowed; and a monitor for detecting said state of said switch;

wherein a write operation to said plurality of semiconductor memory cards is prohibited when said monitor detects that said switch indicates that write operations to the plurality of semiconductor memory cards is not allowed.

3. A semiconductor memory device as recited in claim 1, wherein a surface of each of said plurality of semiconductor memory cards is recessed to form each of said first end portions, so that each of said first end portions has a step-like shape, and each of said plurality of semiconductor memory cards is provided with a terminal section on said surface, wherein said housing includes a circuit substrate having a first surface and a second surface opposite to said first surface, wherein said plurality of semiconductor memory cards are disposed on said first surface of said circuit substrate with said terminal sections facing away from said circuit substrate, and wherein said controller is disposed on said second surface of said circuit substrate.

4. A semiconductor memory device as recited in claim 1, wherein said housing has a size conforming to Type II of the PC Card Standards by the PCMCIA, in which a nominal width of said housing is 54.0 mm, a nominal length of said housing is 85.6 mm, and a nominal thickness of a thickest part of said housing is 5.0 mm, and wherein each of said plurality of semiconductor memory cards has a size conforming to the SD Memory Card® Standards by the SD Association, in which a nominal width of each semiconductor memory card is 24.0 mm, a nominal length of each semiconductor memory card is 32.0 mm, and a nominal thickness of a thickest part of each semiconductor memory card is 2.1 mm.

5. A semiconductor memory device as recited in claim 4, further comprising:

a switch provided in said housing and operable from outside of said housing, said switch having a state which indicates whether write operations to the plurality of semiconductor memory cards are allowed; and a monitor for detecting said state of said switch;

wherein a write operation to said plurality of semiconductor memory cards is prohibited when said monitor detects that said switch indicates that write operations to the plurality of semiconductor memory cards is not allowed.

6. A semiconductor memory device as recited in claim 4, wherein said housing includes a restricting mechanism for restricting removal of said plurality of semiconductor memory cards from said housing.

7. A semiconductor memory device as recited in claim 6, further comprising:

a switch provided in said housing and operable from outside of said housing, said switch having a state which indicates whether write operations to the plurality of semiconductor memory cards are allowed; and a monitor for detecting said state of said switch;

wherein a write operation to said plurality of semiconductor memory cards is prohibited when said monitor detects that said switch indicates that write operations to the plurality of semiconductor memory cards is not allowed.

8. A semiconductor memory device as recited in claim 4, wherein a surface of each of said plurality of semiconductor memory cards is recessed to form each of said first end portions, so that each of said first end portions has a step-like shape, and each of said plurality of semiconductor memory cards is provided with a terminal section on said surface, wherein said housing includes a circuit substrate having a first surface and a second surface opposite to said first surface, wherein said plurality of semiconductor memory cards are disposed on said first surface of said circuit substrate with said terminal sections facing away from said circuit substrate, and wherein said controller is disposed on said second surface of said circuit substrate.

9. A semiconductor memory device as recited in claim 4, wherein said plurality of semiconductor memory cards is constituted by four semiconductor memory cards, and wherein another two semiconductor memory cards are disposed flat, adjacent to each other along the smaller axis of said housing, and adjacent to said two semiconductor memory cards along the larger axis of said housing.

10. A semiconductor memory device as recited in claim 9, further comprising:

a switch provided in said housing and operable from outside of said housing, said switch having a state which indicates whether write operations to the plurality of semiconductor memory cards are allowed; and a monitor for detecting said state of said switch;

wherein a write operation to said plurality of semiconductor memory cards is prohibited when said monitor detects that said switch indicates that write operations to the plurality of semiconductor memory cards is not allowed.

11. A semiconductor memory device as recited in claim 9, wherein a surface of each of said plurality of semiconductor memory cards is recessed to form each of said first end portions, so that each of said first end portions has a step-like shape, and each of said plurality of semiconductor memory cards is provided with a terminal section on said surface, wherein said housing includes a circuit substrate having a first surface and a second surface opposite to said first surface, wherein said plurality of semiconductor memory cards are disposed on said first surface of said circuit substrate with said terminal sections facing away from said circuit substrate, and wherein said controller is disposed on said second surface of said circuit substrate.

12. A semiconductor memory device as recited in claim 11, further comprising:
   a switch provided in said housing and operable from outside of said housing, said switch having a state which indicates whether write operations to the plurality of semiconductor memory cards are allowed; and
   a monitor for detecting said state of said switch; wherein a write operation to said plurality of semiconductor memory cards is prohibited when said monitor detects that said switch indicates that write operations to the plurality of semiconductor memory cards is not allowed.

* * * * *